(12) United States Patent
Degeling et al.

(10) Patent No.: US 12,519,205 B2
(45) Date of Patent: Jan. 6, 2026

(54) STATOR ANTENNA UNIT FOR A MEASURING ARRANGEMENT

(71) Applicant: Flender GmbH, Bocholt (DE)

(72) Inventors: Tobias Degeling, Bocholt (DE); Marc Lehmkuhl, Bocholt (DE); Stefan Essink, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/850,978

(22) PCT Filed: Apr. 4, 2023

(86) PCT No.: PCT/EP2023/058774
§ 371 (c)(1),
(2) Date: Sep. 25, 2024

(87) PCT Pub. No.: WO2023/202874
PCT Pub. Date: Oct. 26, 2023

(65) Prior Publication Data
US 2025/0219280 A1  Jul. 3, 2025

(30) Foreign Application Priority Data
Apr. 19, 2022 (EP) .................... 22168811

(51) Int. Cl.
*H01Q 1/22* (2006.01)
*F16H 57/021* (2012.01)
(Continued)

(52) U.S. Cl.
CPC ............. *H01Q 1/22* (2013.01); *F16H 57/021* (2013.01); *F16H 2057/02026* (2013.01); *F16H 2057/02073* (2013.01); *G01M 13/02* (2013.01)

(58) Field of Classification Search
CPC ............... H01Q 1/22; F16H 57/021; F16H 2057/02026; F16H 2057/02073; G01M 13/02
See application file for complete search history.

(56) References Cited

U.S. PATENT DOCUMENTS 5,677,488 A * 10/1997 Monahan ................ F16C 19/30
73/660
8,596,146 B2 * 12/2013 Ono ...................... G01L 1/2231
73/862.045
(Continued)

FOREIGN PATENT DOCUMENTS

EP  1920221 A1  5/2008
EP  2113930 A2 * 11/2009 ............. H01F 38/18
(Continued)

OTHER PUBLICATIONS

International Search Report issued on Jun. 6, 2023 by the European Patent Office in International Application PCT/EP2023/058774.

*Primary Examiner* — Thomas C Diaz
(74) *Attorney, Agent, or Firm* — Henry M. Feierelsen LLC

(57) ABSTRACT

A stator antenna unit for mounting in a transmission housing structure and for interaction with a rotor element arranged in the transmission housing structure on a transmission component and describing an axial direction Includes an annular antenna holder designed of multiple parts and pivotable between a circumferentially closed position and a circumferentially open position via a hinge, a signal receiver extending circumferentially on the antenna holder, and a signal evaluation unit fastened to the antenna holder and connected electrically and in signal communication with the signal receiver.

15 Claims, 9 Drawing Sheets

(51) Int. Cl.
*F16H 57/02* (2012.01)
*G01M 13/02* (2019.01)

(56) References Cited

U.S. PATENT DOCUMENTS

| | | | | |
|---|---|---|---|---|
| 9,011,013 | B2* | 4/2015 | Norimatsu | F16C 19/522 |
| | | | | 73/862.045 |
| 2005/0227538 | A1* | 10/2005 | Engel | G01L 9/0001 |
| | | | | 439/607.41 |
| 2022/0364944 | A1* | 11/2022 | Fuller | G01L 19/086 |

FOREIGN PATENT DOCUMENTS

| | | | |
|---|---|---|---|
| EP | 2 113930 | A3 | 6/2013 |
| EP | 3696940 | A1 | 8/2020 |
| EP | 3786591 | A1 | 3/2021 |
| GB | 2129138 | | 5/1984 |
| WO | WO 2007/025720 | | 3/2007 |

* cited by examiner

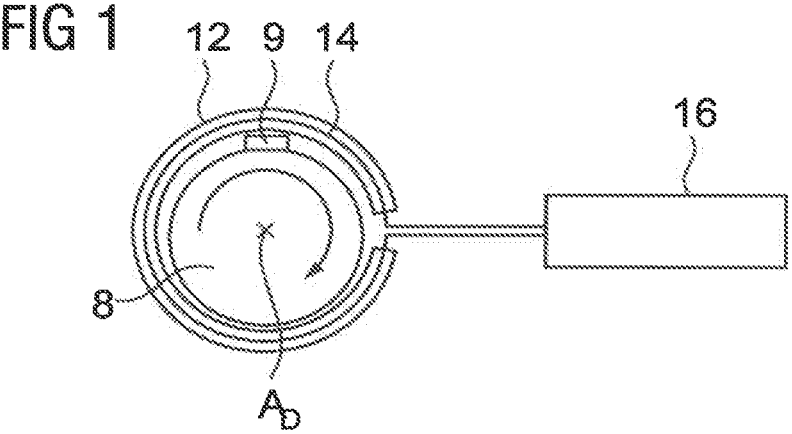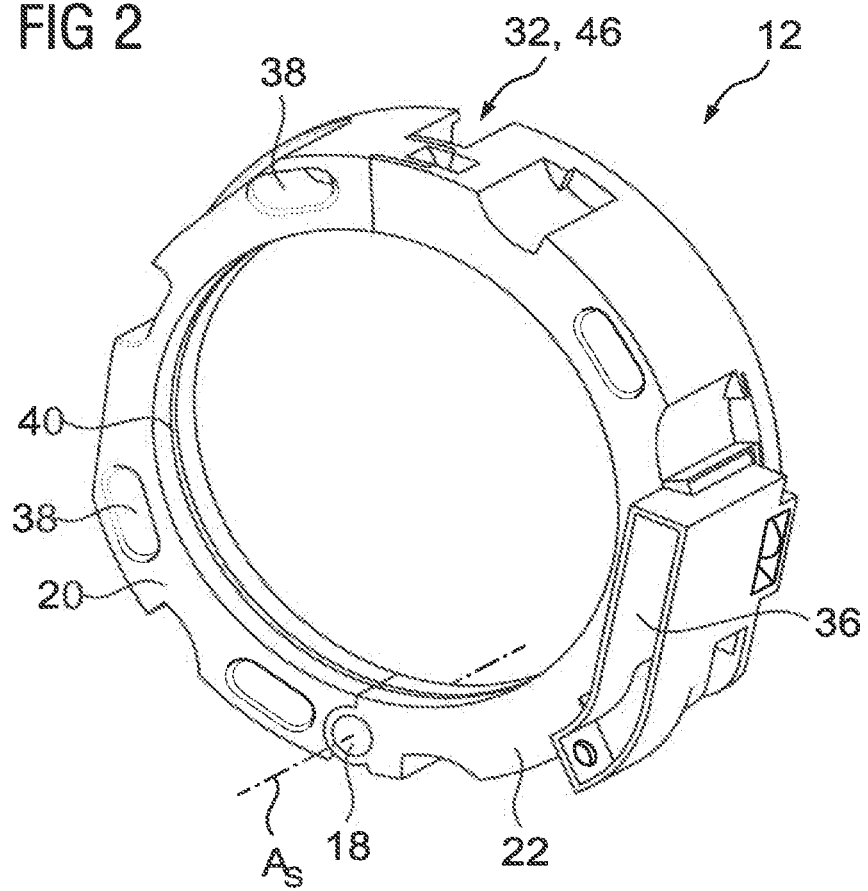

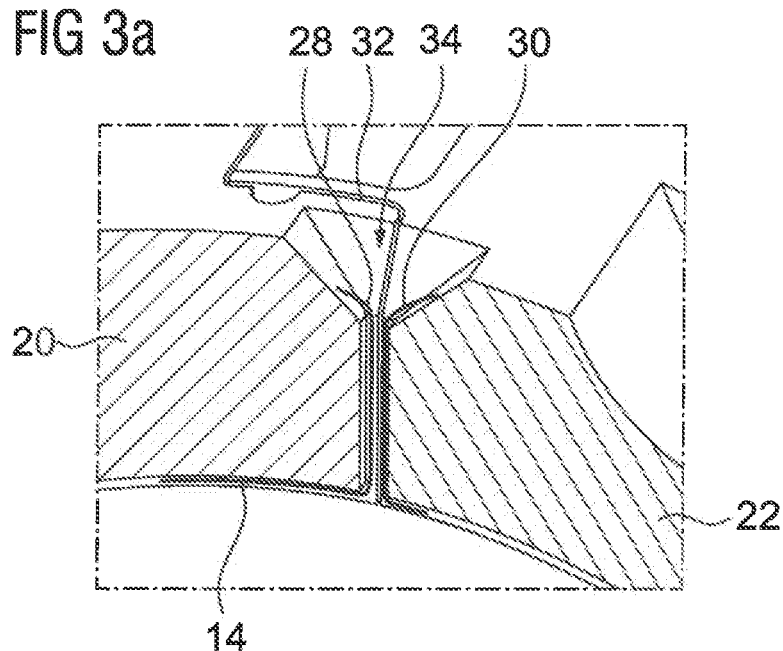
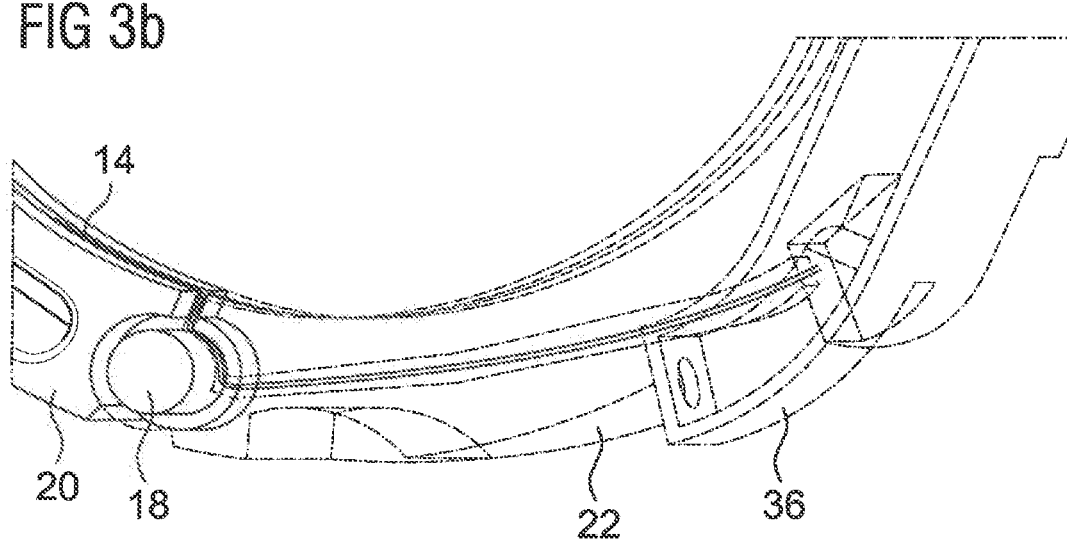

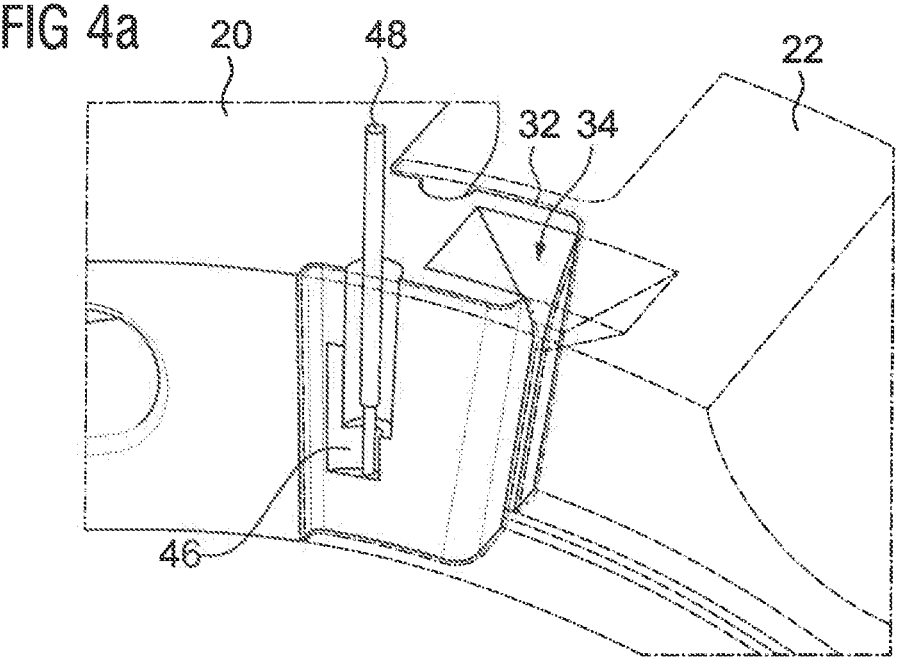
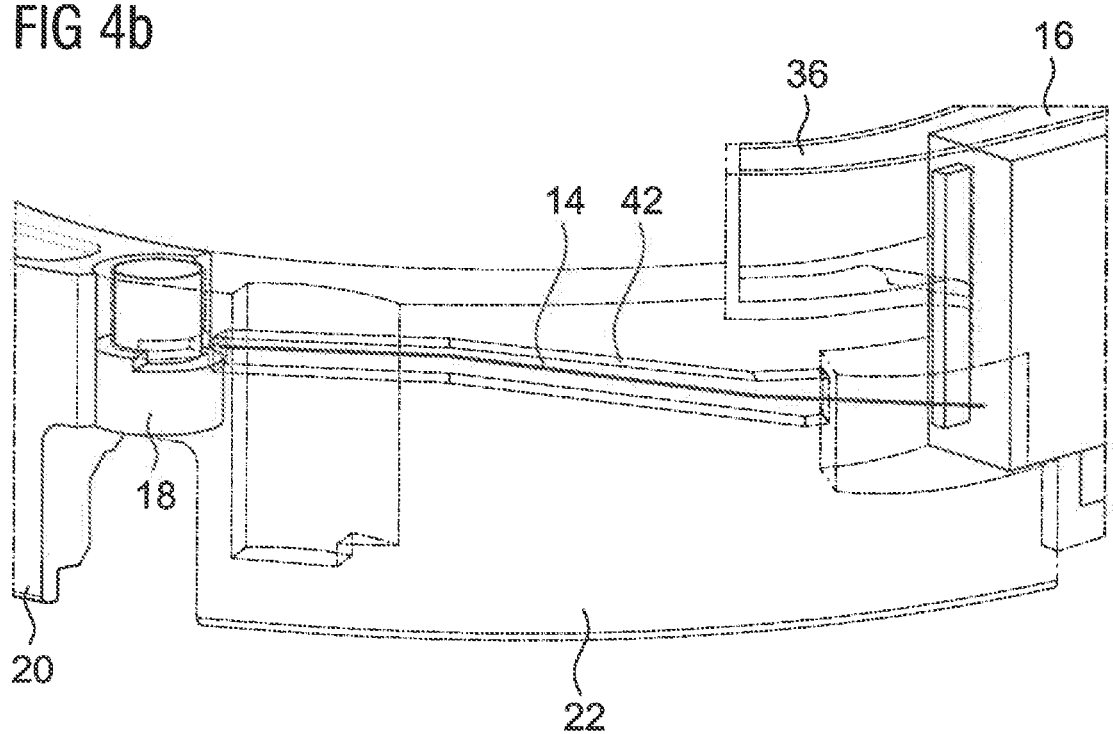

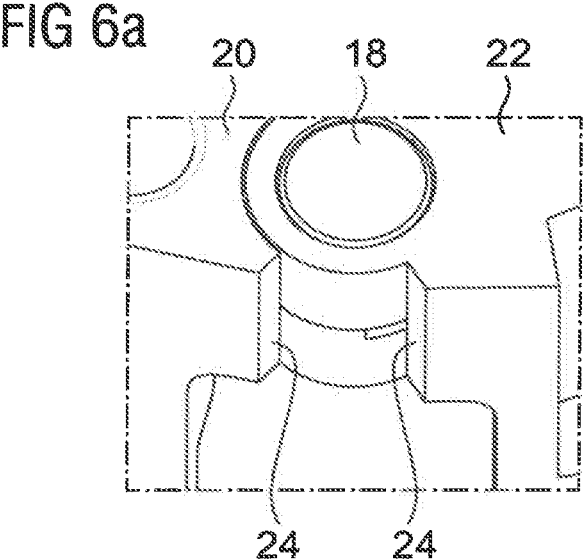
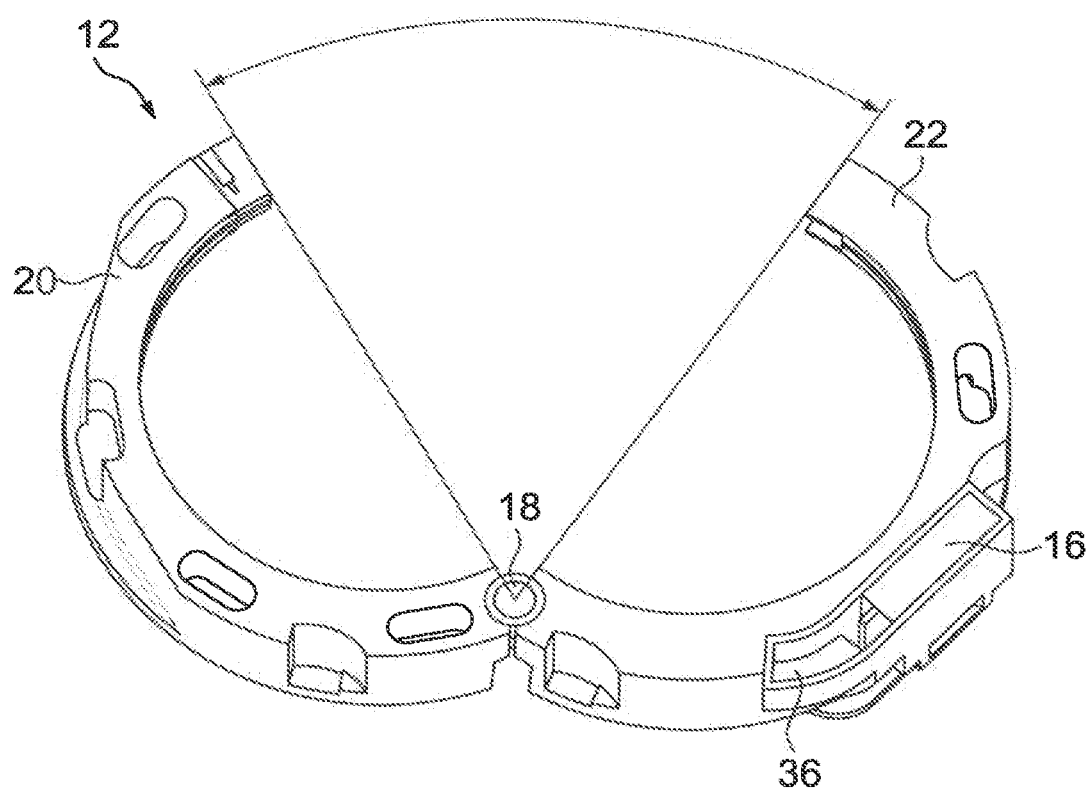

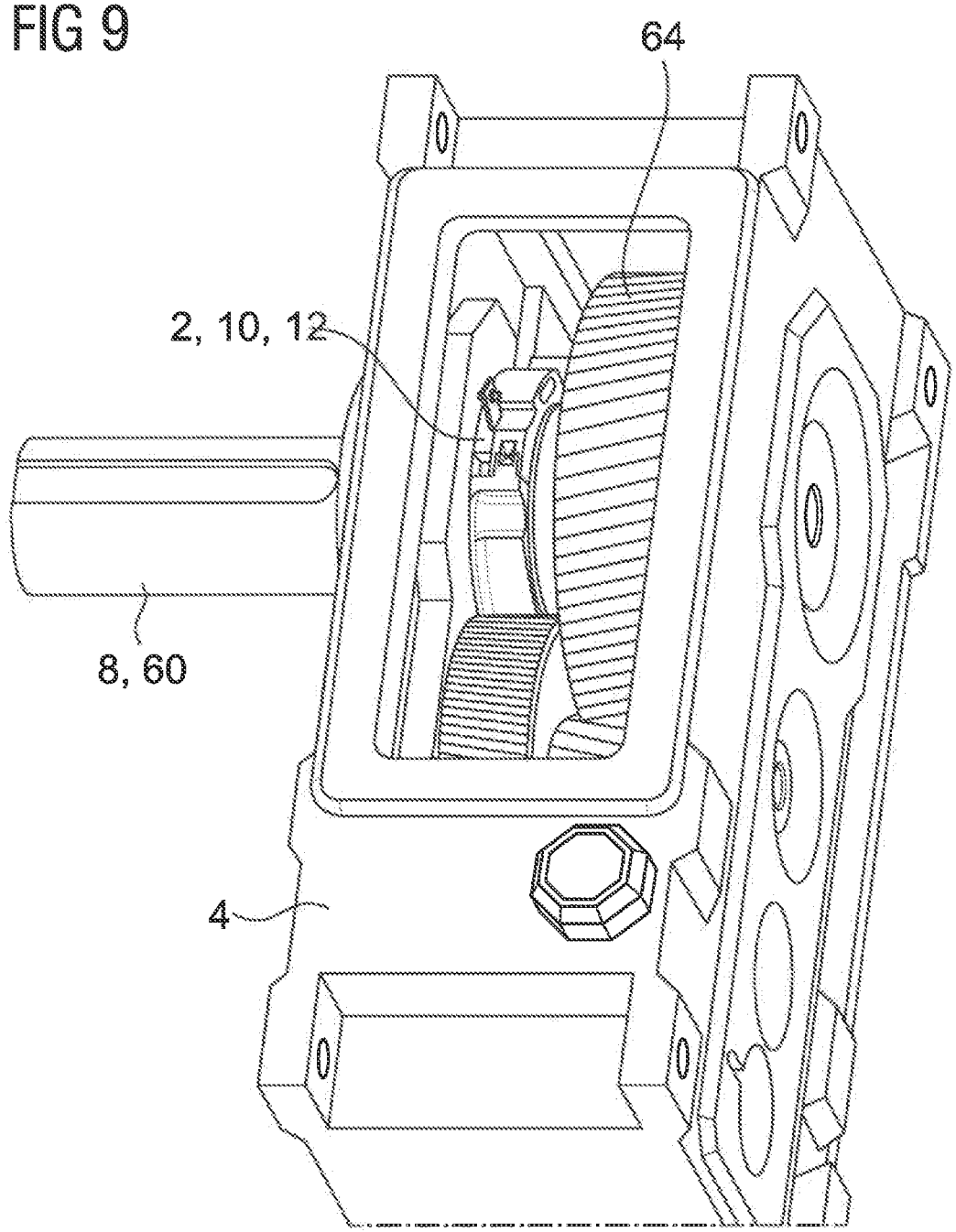

STATOR ANTENNA UNIT FOR A MEASURING ARRANGEMENT

CROSS-REFERENCES TO RELATED APPLICATIONS

This application is the U.S. National Stage of International Application No. PCT/EP2023/058774, filed Apr. 4, 2023, which designated the United States and has been published as International Publication No. WO 2023/202874 A1 and which claims the priority of European Patent Application, Serial No. 22168811.2, filed Apr. 19, 2022, pursuant to 35 U.S.C. 119 (a)-(d).

BACKGROUND OF THE INVENTION

The invention relates to a stator antenna unit for mounting in a transmission housing structure and for interaction with a rotor element arranged in the transmission housing structure on a transmission component and describing an axial direction, having an annular antenna holder, a signal receiver extending circumferentially on the antenna holder and a signal evaluation unit connected electrically and according to signal technology to the signal receiver.

In mechanically highly stressed components, such as transmissions, for a long time it has been usual to detect and monitor loading states with sensors. State variables such as torque, temperatures or vibrations are detected. The state variables must generally be tapped off on or in a rotating component via appropriate sensor components, transmitted to a stationary component and finally provided outside the transmission. Here, it is additionally necessary to supply the sensor components with energy, i.e. voltage and current. In EP 3 786 591 A1, a sensor unit for monitoring a bearing in a transmission is described. EP 3 696 940 A1 shows a solution in which a plurality of signal receivers are arranged over the circumference, specifically in such a way that each signal receiver covers a part of the circumference and extends in the manner of a slip ring in this partial circumferential region. Other solutions are in principle constructed in such a way that a rotating component, for example a shaft, carries a coil with a metal core and is surrounded by a stationary antenna unit. The antenna unit is connected electrically and according to signal technology to an evaluation unit, wherein the evaluation unit is in any case arranged outside the transmission housing structure, since there it is not subjected to the conditions prevailing in the interior of the transmission housing structure. However, the evaluation unit is then subjected to the ambient conditions, which, not least, include a mechanical action resulting from handling devices. There is a continuous need to improve such sensor components with respect to their arrangement and their interaction.

The object of the invention is to indicate measures which permit an Improved arrangement and an improved interaction of sensor components in the applications described.

SUMMARY OF THE INVENTION

The object is achieved by a stator antenna unit as set forth hereinafter. Preferred configurations are specified in the sub-claims and the following description, which can represent an aspect of the invention in each case on their own or in combination. If one feature is illustrated in combination with another feature, this is used only for the simplified illustration of the invention and is in no way intended to mean that this feature cannot be a development of the invention without the other feature.

One embodiment relates to a stator antenna unit for mounting in a transmission housing structure and for interaction with a rotor element arranged in the transmission housing structure on a transmission component and describing an axial direction, comprising an annular antenna holder, a signal receiver extending circumferentially on the antenna holder, a signal evaluation unit connected electrically and according to signal technology to the signal receiver and fastened to the antenna holder, wherein the antenna holder is of multi-part design and can be pivoted between a circumferentially closed position and a circumferentially open position via a hinge.

The transmission housing structure can be a transmission housing which can be built up from multiple parts. For example, two housing halves set opposite each other via respective connecting flanges can be provided. It is also possible to provide a main housing part against which a housing cover is placed in order to obtain a closed transmission housing. The housing halves or the housing part can be formed in the shape of a trough. The transmission housing can form respective shaft leadthroughs implemented as bores for one or more drive shafts and one or more output shafts. A bearing for supporting one of the shafts can be accommodated in a bore. An oil reservoir for receiving at least part of an oil filling can be provided in a lower area of the transmission housing. The statements above and below relate to the Earth's gravitational field and to the regular installation position during the intended use of the transmission.

A transmission component is, for example, a rotating component which describes an axial direction through its axis of rotation. Such a component can be a transmission shaft on the drive or output side, a rolling-contact or sliding bearing or else a toothed element. The rotor element can be, for example, a coil with a ferrite core arranged on a transmission shaft.

The annular antenna holder is arranged circumferentially around the rotor element in order to enter into interaction with the latter. The antenna holder is expediently held and positioned with respect to the transmission housing structure. In particular, positioning can include radial and axial tolerance compensation. The term "annular" can also be designated as "circular", as long as this is not understood in the strict geometric sense. However, it is preferred that an inner circumferential surface of the antenna holder is geometrically circular and the signal receiver extending circumferentially on the antenna holder is arranged in the area of this inner circumferential surface. Preferably, the signal receiver is let into the inner circumferential surface, in particular into a groove extending circumferentially or into a channel. The groove or the channel, viewed in cross section, can be configured to be dovetail-shaped, so that the signal receiver can be clicked in simply and is held in a form-fitting manner with respect to the antenna holder. Alternatively, a rectangular, circumferential groove having a plurality of cams distributed over the circumference, behind which the signal receiver can be clamped, can also be provided. Once more alternatively, the signal receiver can also be Inserted Into a rectangular, circumferential groove and then adhesively bonded in. The antenna holder can be produced in a 3D printing process. Alternatively, it can be produced in the injection molding process, the vacuum casting process or other casting processes. It is also conceivable that it is produced in a conventional, material-removing process.

The evaluation unit in the present case includes the stator electronics. Via the evaluation unit, an induction field acting on the rotor element is produced via an alternating current. The rotor element is supplied with a voltage thereby. The evaluation unit modulates the induction field via the alternating current, so that the respective measured data of the state variables to be detected can be transmitted via modulation. The signal receiver preferably comprises a copper cable or a copper tape which is pre-insulated or laminated, so that insulating and covering steps are not required during mounting. The copper cable or the copper tape can be fixed over the antenna holder at the correct distance above the rotor element both in the axial and in the radial direction. The copper cable or copper tape is expediently laid as a loop. Via the antenna holder, it is ensured that the loop forms a closed circuit in order to avoid energy interruptions or communication errors and, during an operating situation, is neither pressed in nor lengthened nor impaired in any other way. The loop is incorporated via the antenna holder in such a way that no mechanical forces can bring about geometrical changes or damage, and also position changes axially and radially are ruled out. The fact that the evaluation unit is fastened to the antenna holder means that it is possible to ensure that the evaluation unit and the loop of the signal receiver can be positioned close to each other.

The stator antenna unit is expediently grounded. For this purpose, a connection to the transmission housing structure, which assumes earth potential, is provided. In order to connect the stator antenna unit to the transmission housing structure, a grounding strip from the evaluation unit can be laid in a channel. A metal sheet, for example, which is connected to the transmission housing structure via a screw, presses onto the end of the grounding strip. A permanently defined pressing force can be generated by a spring under the screw head. Other possible connections of the grounding strip are also possible.

Given the two-part configuration of the antenna holder, the latter can be assembled from two or more substantially identical parts. Provision is made for one of these parts to carry the evaluation unit. The two-part configuration has in particular the advantage that the stator antenna unit can be mounted around a transmission shaft which has already been mounted in a transmission housing structure. In particular, the stator antenna unit can also be mounted in the course of retrofitting of transmissions that are already in operation. The two-part antenna holder can be opened or folded open via the hinge in order to guide it or to slip it over the transmission shaft. The antenna holder can then be closed again. For this purpose, a latching mechanism can be provided. In a preferred configuration, it is provided that the antenna holder is of two-part design via two half-shell elements, and the two half-shell elements are connected to each other via the hinge and can be pivoted between the circumferentially closed position and the circumferentially open position. Provision can be made for each half-shell element to describe substantially 180° of a complete circumference in this case. Alternatively, it is also possible for three shell elements to be provided, which are then pivotably connected to one another via two hinges. For specific applications, it is also conceivable that more than three shell elements are connected to one another in an articulated manner. In particular, despite the two-part or multi-part configuration of the antenna holder, it is provided that the signal receiver extends completely circumferentially on the antenna holder or is arranged on the latter. Here, fully circumferentially can mean that the signal receiver encloses virtually 360° or even encloses 360°. In one possible embodiment, exactly one signal receiver can be provided. It is advantageous in particular that a combination of the multi-part nature of the antenna holder is implemented with a signal receiver extending completely circumferentially. Thus, the signal receiver is guided physically over at least one of the separation points of a two-part antenna holder. Starting from this point, the signal receiver can be guided to the outside via the respective other separation point, for example in order to be guided to the signal evaluation unit.

The stator antenna unit described here can be integrated completely Into a transmission with its components and can be used universally, since it can be used as a series solution for different transmission series purely by scaling. The outlay on design is reduced to a minimum. The mounting of the pre-configured stator antenna unit can be incorporated very simply into the typical mounting process of the transmission. The stator antenna unit provides a series-capable possible way with which telemetry for measuring systems can be used in transmission series. The complete integration of the stator antenna unit leads to highly elevated reliability of the telemetry.

In a preferred configuration, it is provided that a stop arranged circumferentially on the outside of the antenna holder limits pivoting from the closed position into the open position. In particular, the stop can be provided on the outside of the hinge. As a result of the stop and the limiting of the pivoting movement, it is ensured that when the antenna holder is pivoted open into the open position, the signal receiver, i.e. for example the copper cable or copper tape, is not damaged. In particular, provision can be made for the stop to limit the pivoting open of the two half-shell elements to about 70°. This opening angle makes it possible for the antenna holder to be slipped over the outer diameter of a transmission shaft.

In an additionally preferred configuration, it is provided that the signal receiver in the area of the hinge is guided in the direction of the signal evaluation unit, starting from the circumferential course. The signal receiver can in particular be guided in such a way that the signal receiver, starting from the circumferential course, is first led past the hinge in the radial direction and then guided again in the circumferential direction or else in the tangential direction to the evaluation unit. The signal receiver, which is preferably implemented as a copper cable or copper tape, is conductively connected to the evaluation unit, a soldered connection preferably being used for this purpose. In order to ensure the accessibility to the evaluation unit to apply the soldered connection, an access opening is provided in the antenna holder. Instead of this soldered connection, clipping in, pressing on or screw clamping can also be provided. By means of the configuration in which the evaluation unit is arranged directly on the antenna holder, it is advantageously possible to ensure that a length of the signal receiver from the hinge as far as a connection to the evaluation unit does not exceed a distance measurement of 400 mm.

In an additionally preferred refinement, it is provided that the antenna holder in the area of the hinge forms on an axial side a recess extending as far as an axis of rotation of the hinge, to receive the signal receiver guided in the direction of the signal evaluation unit. The recess ensures that when the antenna holder is pivoted into the open position, the signal receiver, i.e., for example, the copper cable or copper tape, is not lengthened or compressed.

A preferred configuration additionally provides that two wire ends of the signal receiver are guided radially outward, starting from the circumferential course, at a separation point of the antenna holder located, preferably diametrically, opposite the hinge. The separation point is the area in which the two half-shell elements meet each other in the closed position of the antenna holder and in which they move apart from each other when opened. The latching mechanism can be arranged at the separation point. At the separation point, the signal receiver has two wire ends which are initially not connected to each other and are conductively connected to each other only after mounting in a transmission structure has been carried out. Expediently, the two wire ends are located directly or largely close to each other in the region of the separation point in the closed position of the antenna holder, so that at a later point in time, the two wire ends can be readily connected. In a practical configuration, the two wire ends can open in a funnel formed circumferentially on the outside of the antenna holder. In this way, by simple measures, it is possible for the two wire ends to be conductively connected to each other via soldering in the closed position and at least in one operating state of the antenna holder. The funnel advantageously facilitates the application of a soldering material and the targeted supply to the two wire ends.

In a further preferred configuration, it is provided that the signal evaluation unit is accommodated in a receiving pocket of the antenna holder, potted with a synthetic resin. This ensures that the evaluation unit is attached securely and firmly to the antenna holder. For the unambiguous positioning of the evaluation unit during the assembly, the evaluation unit is preferably accommodated in the receiving pocket via a form-fitting code. Following the insertion of the evaluation unit, the potting with synthetic resin is carried out.

In an additionally preferred configuration, provision is made for at least one axially directed aperture to be provided in the antenna holder. This ensures that the stator antenna unit can, for example, be arranged axially in front of a bearing and an oil flow from and to the bearing is ensured by the at least one axial aperture. A buildup of oil is thus avoided.

The object is also achieved by a transmission comprising a transmission housing, at least one shaft rotatably mounted in the transmission housing via a rolling-contact bearing, wherein the rolling-contact bearing is seated in a housing bore of the transmission housing, and at least one stator antenna unit as previously described surrounding the shaft is provided. Provision can be made in this case for the antenna holder to project into the housing bore with an at least partially circumferential collar. For example, the collar can partly circumferentially cover about 200° of a total circumference. In a practical configuration, it can be provided that the antenna holder is seated in a circumferentially supporting manner in the housing bore and bears axially against a bearing ring of the rolling-contact bearing. Alternatively, provision can also be made for the axial support to be provided via a bush seated in the housing bore. Via the circumferential support, positioning of the antenna holder in the radial direction relative to the transmission housing is hereby achieved. By the contact of the antenna holder against a bearing ring of the rolling-contact bearing which, for example, can be the outer bearing ring, positioning of the antenna holder in the axial direction relative to the transmission housing is achieved. It is advantageous here that the telemetry is largely located in the immediate vicinity of the bearing; the ability to insert the telemetry is increased. It is possible for many different relevant measured variables to be recorded and transmitted with the aid of the telemetry. Measured variables are, for example, torque, axial forces, bending forces, tooth root stresses, temperatures on the bearing inner ring, stresses in the vicinity of the notch.

The basic object is also achieved by a drive train comprising a first shaft designed as a drive shaft, which is coupled in a torque-transmitting manner via a transmission to a second shaft designed as an output shaft, wherein the transmission is designed as previously described.

Equally, the object is achieved by an industrial application, comprising a drive unit which is connected in a torque-transmitting manner via a transmission to an output drive unit, wherein the transmission is designed as previously described.

BRIEF DESCRIPTION OF THE DRAWING

The invention will be explained by way of example below with reference to the appended drawings and by using preferred exemplary embodiments, wherein the features illustrated below can represent an aspect of the invention both on its own in each case and also in combination. In the drawings:

FIG. 1: shows a schematic and basic structure of a measuring arrangement;

FIG. 2: shows an antenna holder as a single unit in a perspective illustration;

FIGS. 3*a*, 3*b*: show details of the course of the signal receiver;

FIG. 4*a*: shows a detail of the separation point of the antenna holder;

FIG. 4*b*: shows a view of the region of the antenna holder between the hinge and the receiving pocket;

FIGS. 6*a*, 6*b*: show a further detail of the antenna holder and of the antenna holder in the open position;

FIGS. 8*a*, 8*b*, 9: show the stator antenna unit in an assembly with a transmission housing structure.

DETAILED DESCRIPTION OF PREFERRED EMBODIMENTS

Figure 5A:
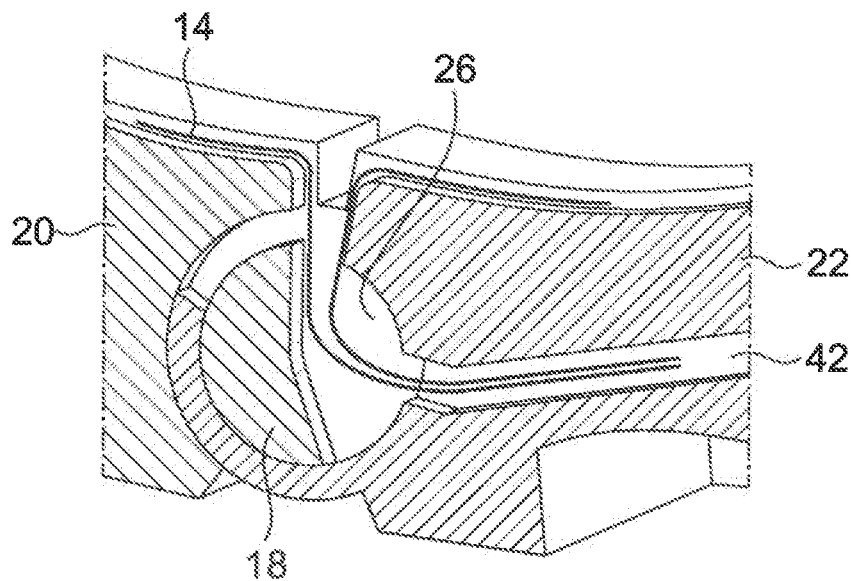
FIGS. 5*a*, 5*b*: show detailed views of the antenna holder and of the signal receiver in the area of the hinge.

FIG. 1 shows, purely schematically, a basic structure of a measuring arrangement 2. A rotor element 8 provided with a coil and ferrite core 9 is surrounded by an antenna holder 12, on which a signal receiver 14 is arranged circumferentially. The signal receiver 14 forms a loop on the antenna holder 12. Starting from the loop on the antenna holder 12, the signal receiver 14 continues to a signal evaluation unit 16. As will be described below, the signal evaluation unit 16 is fastened to the antenna holder 12, which is not shown in FIG. 1. The signal receiver 16, the antenna holder 12 and the evaluation unit 16 are part of a stator antenna unit 10, which functionally forms the counterpart to the rotor element 8 with coil and ferrite core 9. The signal receiver 14 in the present case can be designed as copper wire or copper tape and can be provided with enveloping insulation. The rotor element 8 is rotatable about an axis of rotation $A_D$, so that the axis of rotation $A_D$ describes an axial direction D. A possible direction of rotation of the rotor element 8 is symbolized by the curved arrow. The rotor element 8 can be, for example, a transmission shaft.

From a stator antenna unit 10, FIG. 2 shows the antenna holder 12 as a detail in a perspective illustration. The antenna holder 12 is substantially annular and is assembled in two parts from two half-shell elements 20, 22. The two half-shell elements 20, 22 are pivotably connected to each other at their one ends via a hinge 18 and, at their other ends substantially diametrically opposite to the hinge 18, are connected to each other via a separation point 32. Via the separation point 32, the respective ends of the half-shell elements 20, 22 can be separated from each other after a latching mechanism 46 has been released, so that the half-shell elements 20, 22 can be pivoted open with respect to each other about a pivot axis $A_S$ of the hinge 18.

The antenna holder 12 forms on one of the half-shell elements 20, 22 a receiving pocket 36 for receiving and for holding the evaluation unit 16. The evaluation unit is not illustrated in FIG. 2. The antenna holder 12 also has a plurality of axially directed and circumferentially distributed apertures 38, through which oil can flow during operation, for example from and to a bearing. Furthermore, on an inner circumferential surface of the antenna holder 12 there is formed a circumferential channel 40, which is used to receive the signal receiver 14, although this is not shown in FIG. 2. The channel 40 can be designed as a groove and, viewed in cross section, can be configured so as to be dovetail-shaped, so that the signal receiver 14 can be clicked in simply and is held in a form-fitting manner with respect to the antenna holder 12.

FIGS. 3a and 3b show details of the course of the signal receiver 14 in the area of the separation point 32—FIG. 3a—and in the area of the hinge 18 as far as the receiving pocket 36—FIG. 3b. In FIG. 3a) it can be seen that the signal receiver 14 at the separation point 32 is guided radially outward, starting from the circumferential course in the channel 40, and two wire ends 28, 30 of the signal receiver 14 open in a funnel 34 formed circumferentially on the outside of the antenna holder 12. Via the funnel 34, it is simply possible to connect the two wire ends 28, 30 conductively to each other via soldering in the closed position and at least in one operating state of the antenna holder 12. Soldering is not Illustrated in the present case. In FIG. 3a, it can be seen that the signal receiver 14 is led past the hinge 18 in the radial direction and is then guided again in the circumferential direction or else in the tangential direction to the receiving pocket 36 to the evaluation unit 16—not illustrated.

FIG. 4a shows a further detail of the separation point 32. The separation point 32 comprises a latching mechanism 46, which acts between the two half-shell elements 20, 22, so that the latter do not move unintendedly into the open position. The latching mechanism 46 can be unlocked by inserting a pin 48, so that the two half-shell elements 20, 22 can then be pivoted into the open position.

FIG. 4b shows a view of the area of the antenna holder 12, in which the signal receiver 14 is guided from the hinge 18 to the evaluation unit 16 seated in the receiving pocket 36. The signal receiver 14 extends between the hinge 18 and the receiving pocket in a guide channel 42.

Figure 5B:
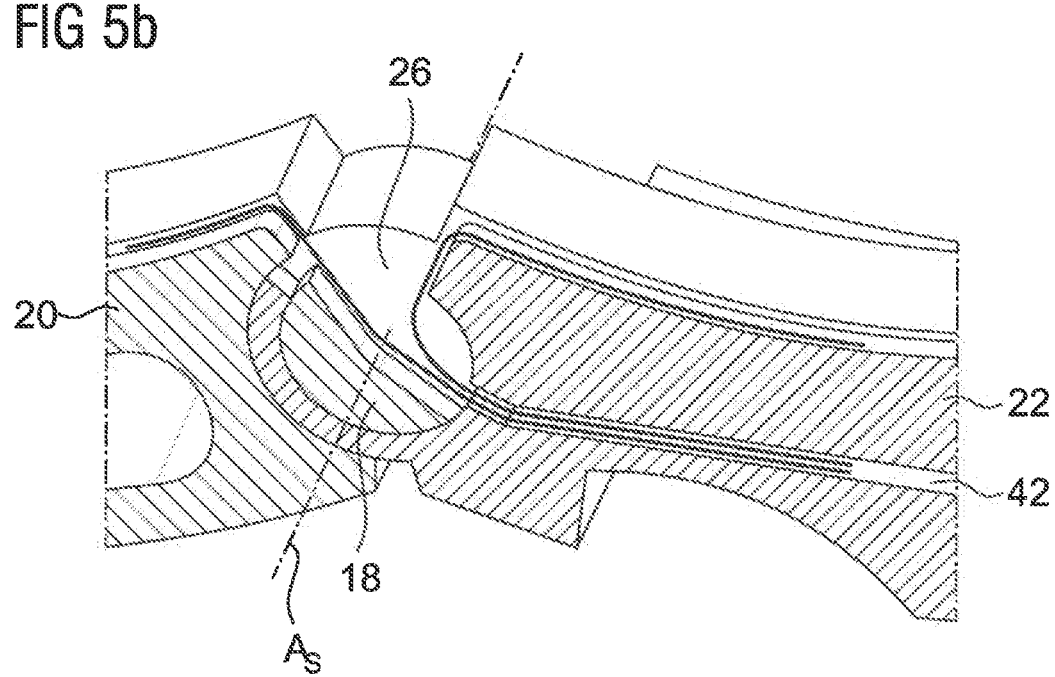

FIGS. 5a and 5b show detail views of the antenna holder 12 and the signal receiver 14 in the area of the hinge 18. FIG. 5a shows the antenna holder 12 in the closed position, in which the two half-shell elements 20, 22 form a ring via the closed separation point 32—not illustrated. FIG. 5b shows the antenna holder 12 in the open position, in which the half-shell elements 20, 22 are pivoted open relative to each other via the hinge 18. On one axial side of the hinge 18, a recess 26 is formed extending as far as the axis of rotation $A_S$ of the hinge 18, to receive the signal receiver 14 guided in the direction of the signal evaluation unit 16.

FIG. 6a shows a further detail of the antenna holder 12, specifically a stop 24, which limits pivoting from the closed position into the open position of the two half-shell elements 20, 22. The stop 24 is arranged circumferentially on the outside in the area of the hinge 18. FIG. 6b shows the two half-shell elements 20, 22 of the antenna holder 12 in the open position, in which further pivoting open is prevented by the stop 24. A value of the angle by which the two half-shell elements 20, 22 in the hinge 18 can be pivoted open relative to each other into the open position can be, for example, 70°.

Figure 7A:
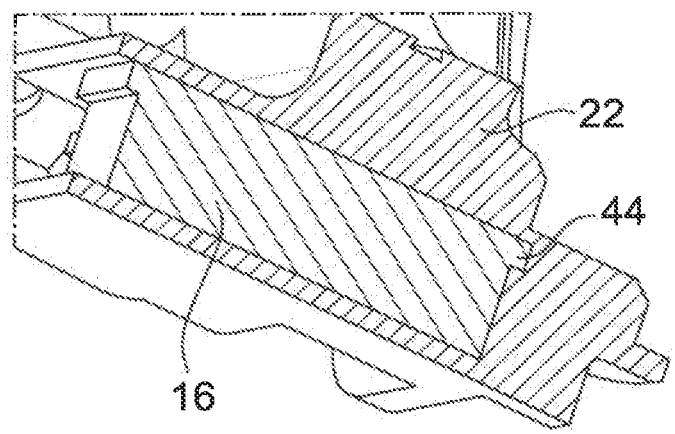
FIGS. 7*a*, 7*b*: show further details of the evaluation unit seated in the receiving pocket.
Figure 7B:
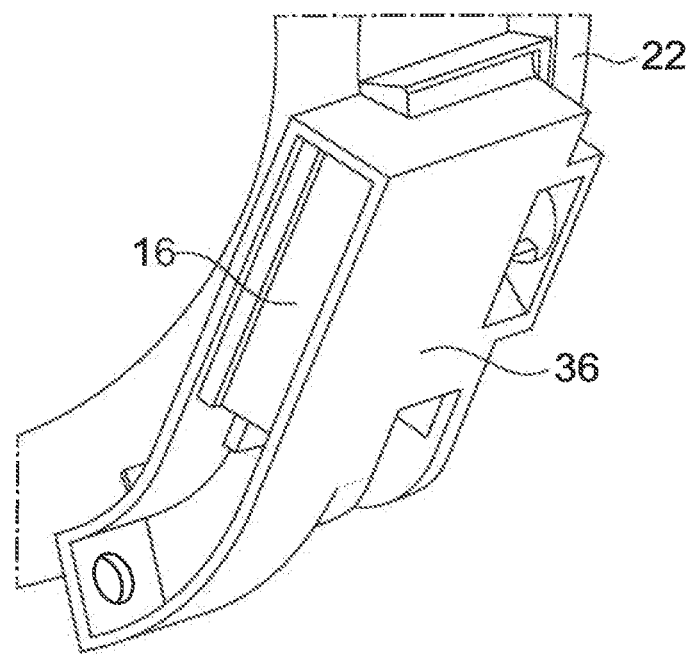

FIGS. 7a and 7b show further details of the evaluation unit 16 seated in the receiving pocket 36. The evaluation unit 16 has a form-fitting code 44 for the unambiguous positioning in the receiving pocket 36.

Figure 8A:
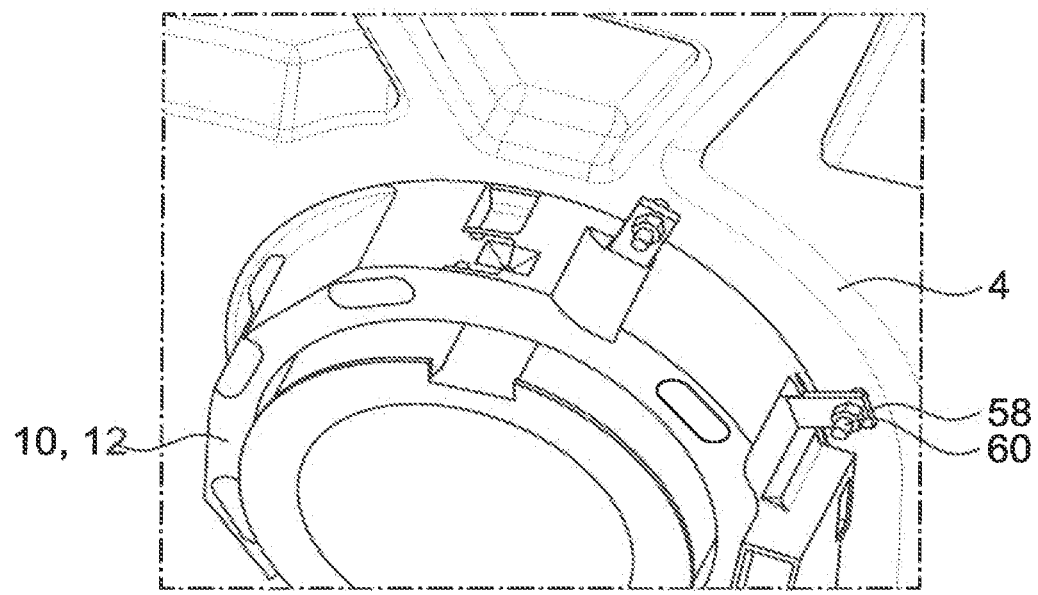
Figure 8B:
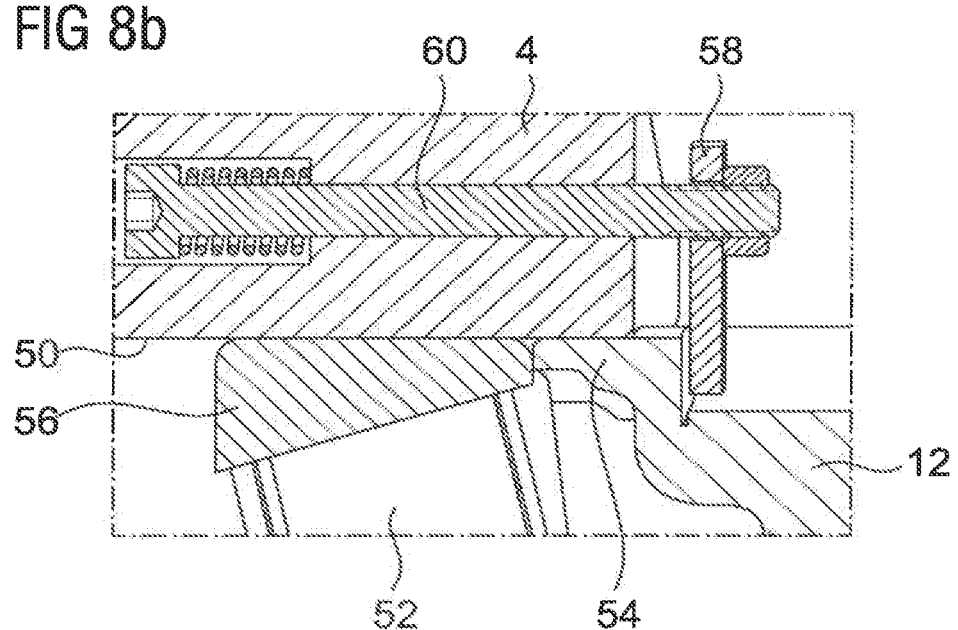

FIGS. 8a and 8b show the stator antenna unit 10 in an assembly with a transmission housing structure 4. The transmission housing structure 4 is formed by a housing side wall in the present case. Formed in the housing side wall 4 is a bearing bore 50, in which a rolling-contact bearing 62 is seated in a known manner, see FIG. 8b. A transmission shaft rotatably held with respect to the transmission housing structure 4 in the rolling-contact bearing 52 is not illustrated here. It can be seen that the stator antenna unit 10 is held against the housing side wall 4 by an inner side. In particular, provision is made for the antenna holder 12 to form a circumferential or partly circumferential collar 54 which projects into the bearing bore 50. The antenna holder 12 is supported circumferentially in the bearing bore 50 via the collar 54 and rests axially against the bearing outer ring 56 of the rolling-contact bearing 52. Furthermore, a plurality of lugs 58 are provided over the circumference of the antenna holder 12. Via the lugs 58 and a corresponding number of axial pins 60, the antenna holder 12 and therefore the entire stator antenna unit 10 is held with respect to the housing side wall 4, wherein the axial and radial positioning, as already described, is carried out via the contact of the collar 54 within the bearing bore 50 and against the bearing outer ring 56.

FIG. 9 shows a further illustration of the stator antenna unit 10 in an assembly with a transmission housing structure 4 in a perspective view. A transmission housing 4 is shown, in which a plurality of transmission components 6, for example in the form of transmission shafts and gear wheels, are accommodated. A stator antenna unit 10 is arranged, as described, on a housing side wall 4, between the latter and a gear wheel 64, wherein the stator antenna unit 10 is arranged surrounding the transmission shaft 62. The transmission shaft 62 has a coil and a ferrite core 9 as previously described and thus forms a rotor element 8. The stator antenna unit 10 and the rotor element 8 together form a measuring arrangement 2.

Figure 10:
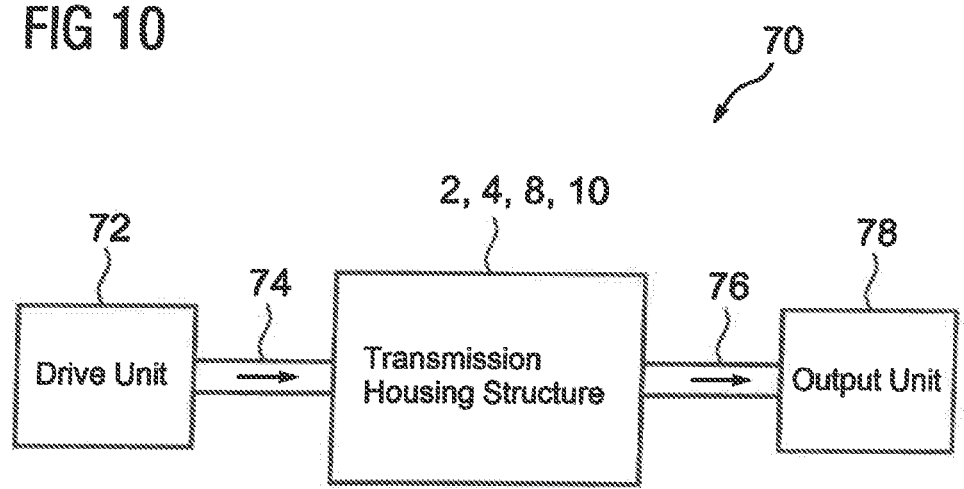
FIG. 10: shows a schematic illustration of an industrial application having a measuring arrangement with stator antenna unit.

FIG. 10 shows a schematic structure of an embodiment of the claimed industrial application 70, which comprises a drive unit 72, which can be formed as an electric motor, internal combustion engine or hydraulic motor. By means of the drive unit 72, a drive output is provided via a drive shaft 74 and can be transmitted via a transmission having a transmission housing structure 4 and an output shaft 76 to an output unit 78. The transmission housing structure 4 has a measuring arrangement 2 as previously described, comprising a stator antenna unit 10 and a rotor element 8.

What is claimed is:

1. A stator antenna unit of for mounting in a transmission housing structure and for interaction with a rotor element arranged in the transmission housing structure on a transmission component and describing an axial direction, the stator antenna unit comprising:
- an annular antenna holder designed of multiple parts and pivotable between a circumferentially closed position and a circumferentially open position via a hinge;
- a signal receiver extending circumferentially on the antenna holder; and
- a signal evaluation unit fastened to the antenna holder and connected electrically and in signal communication with the signal receiver,
- wherein the signal receiver comprises two wire ends which are guided radially outward, starting from a circumferential course, at a separation point of the antenna holder located opposite the hinge.

2. The stator antenna unit of claim 1, wherein the signal receiver extends completely circumferentially on the antenna holder.

3. The stator antenna unit of claim 1, wherein the signal receiver extends circumferentially virtually 360° or 360° on the antenna holder.

4. The stator antenna unit of claim 1, wherein the signal receiver represents the only signal receiver extending circumferentially on the antenna holder.

5. The stator antenna unit of claim 1, wherein the antenna holder is made of two parts comprised of two half-shell elements which are connected to each other via the hinge and pivotable between the circumferentially closed position and the circumferentially open position.

6. The stator antenna unit of claim 1, further comprising a stop arranged circumferentially on an outside of the antenna holder and designed to limit pivoting from the circumferentially closed position into the circumferentially open position.

7. The stator antenna unit of claim 1, wherein the signal receiver is guided in an area of the hinge in a direction of the signal evaluation unit, starting from a circumferential course.

8. The stator antenna unit of claim 7, wherein the antenna holder forms in an area of the hinge on an axial side a recess which is sized to extend as far as an axis of rotation of the hinge so as to receive the signal receiver guided in the direction of the signal evaluation unit.

9. The stator antenna unit of claim 1, wherein the separation point is located diametrically opposite the hinge.

10. The stator antenna unit of claim 1, wherein the two wire ends open in a funnel formed circumferentially on an outside of the antenna holder.

11. The stator antenna unit of claim 1, wherein the two wire ends are conductively connected to each other via soldering in the circumferentially closed position and in an operating state of the antenna holder.

12. The stator antenna unit of claim 1, wherein the signal evaluation unit is accommodated in a receiving pocket of the antenna holder, the stator antenna unit further comprising a synthetic resin for potting the signal evaluation unit in the receiving pocket of the antenna holder.

13. A transmission, comprising:
- a transmission housing;
- a shaft;
- a rolling-contact bearing designed to rotatably mount the shaft in the transmission housing, the rolling-contact bearing being seated in a housing bore of the transmission housing; and
- a stator antenna unit mounted in the transmission housing in surrounding relation to the shaft and comprising an annular antenna holder designed of multiple parts and pivotable between a circumferentially closed position and a circumferentially open position via a hinge, a signal receiver extending circumferentially on the antenna holder, and a signal evaluation unit fastened to the antenna holder and connected electrically and in signal communication with the signal receiver,
- wherein the antenna holder is seated in a circumferentially supporting manner in the housing bore and bears axially against a bearing ring of the rolling-contact bearing or a bush seated in the housing bore.

14. An industrial application, comprising:
- a drive unit;
- an output unit; and
- a transmission designed to connect the drive unit in a torque-transmitting manner to the output unit, the transmission being designed as set forth in claim 13.

15. A drive train, comprising:
- a first shaft designed as a drive shaft;
- a second shaft designed as an output shaft; and
- a transmission designed to couple the first shaft in a torque-transmitting to the second shaft, the transmission comprising a transmission housing, a shaft, a rolling-contact bearing designed to rotatably mount the shaft in the transmission housing, the rolling-contact bearing being seated in a housing bore of the transmission housing, and a stator antenna unit mounted in the transmission housing in surrounding relation to the shaft and comprising an annular antenna holder designed of multiple parts and pivotable between a circumferentially closed position and a circumferentially open position via a hinge, a signal receiver extending circumferentially on the antenna holder, and a signal evaluation unit fastened to the antenna holder and connected electrically and in signal communication with the signal receiver.

* * * * *